United States Patent [19]

Bettcher

[11] Patent Number: 4,637,140

[45] Date of Patent: Jan. 20, 1987

[54] BONING AND TRIMMING KNIFE

[75] Inventor: Louis A. Bettcher, Amherst, Ohio

[73] Assignee: Bettcher Industries, Inc., Birmingham, Ohio

[21] Appl. No.: 696,456

[22] Filed: Jan. 31, 1985

Related U.S. Application Data

[63] Continuation-in-part of Ser. No. 330,553, Dec. 14, 1981, Pat. No. 4,509,261.

[51] Int. Cl.$^4$ ........................ A22C 17/04; A22C 17/12

[52] U.S. Cl. ........................................ 30/276; 17/1 G

[58] Field of Search ............................ 30/276; 17/1 G

[56] References Cited

U.S. PATENT DOCUMENTS

| | | | |
|---|---|---|---|
| Re. 25,947 | 12/1965 | Bettcher . | |
| 2,827,657 | 3/1958 | Bettcher . | |
| 3,269,010 | 8/1966 | Bettcher . | |
| 3,688,403 | 9/1972 | Bettcher . | |
| 3,852,882 | 12/1974 | Bettcher . | |
| 4,142,291 | 3/1979 | Bettcher . | |
| 4,166,317 | 9/1979 | Bettcher . | |
| 4,170,063 | 10/1979 | Bettcher . | |
| 4,175,321 | 11/1979 | Bettcher . | |
| 4,178,683 | 12/1979 | Bettcher . | |
| 4,198,750 | 4/1980 | Bettcher . | |
| 4,236,531 | 12/1980 | McCullough . | |
| 4,363,170 | 12/1982 | McCullough . | |
| 4,439,924 | 4/1984 | Bettcher | 30/276 |
| 4,492,027 | 1/1985 | Bettcher | 17/1 G |
| 4,494,311 | 1/1985 | McCullough | 30/276 |
| 4,509,261 | 4/1985 | Bettcher | 30/276 |
| 4,516,323 | 5/1985 | Bettcher | 17/1 G |
| 4,575,937 | 3/1986 | McCullough | 30/276 |
| 4,575,938 | 3/1986 | McCullough | 30/276 |

*Primary Examiner*—Jimmy C. Peters

*Attorney, Agent, or Firm*—Watts, Hoffmann, Fisher & Heinke

[57] ABSTRACT

A hand knife 20, 120, of the type having a ring-like rotary driven blade useful for cutting meat and other suitable products; a blade housing 24, 124, 224 for a hand knife; and a circular blade 26, 126. The blade housing has a generally circular groove 38, 138, 238 to receive a ring gear portion 56, 256 of the blade while a cutting portion 60 extends from the housing. One arcuate wall portion **38*b*, 138*b*, 238*b* of the housing is frusto-conical and faces a similarly contoured peripheral portion of the blade ring-gear. In the preferred construction the housing recess is formed by a cylindrical wall that surrounds the ring-gear portion of the blade and by a frusto-conical wall that is encircled by the ring-gear portion of the blade. A blade retainer 28, 128 secured to the handle acts against a radial flange 62, 162** of the blade when tightened, to retain the blade within the groove, and when loosened allows removal of the blade from the housing.

27 Claims, 12 Drawing Figures

BONING AND TRIMMING KNIFE

RELATED APPLICATIONS

This application is a continuation-in-part of copending application Ser. No. 330,553 filed Dec. 14, 1981, now U.S. Pat. No. 4,509,261 issued Apr. 9, 1985 the disclosure of which is hereby incorporated herein by reference.

DESCRIPTION

1. Technical Field

This invention relates to an improved hand knife of the type used for trimming and cutting meat and the like with a rotary driven ring-like blade, and to an improved blade housing, blade and handle. Such knives can also find use for trimming and cutting in a variety of industrial applications.

2. Background Art

Rotary knives with ring-like power-driven blades are exemplified by structures shown in U.S. Pat. Nos. 2,827,657; Re. 25,947; 3,852,882; 4,170,063; and 4,198,750. Such knives have a rotary ring-like or annular blade, generally cylindrical or frusto-conical in form, sharpened at one axial end and incorporating gear teeth to form a ring gear portion at the other axial end. The ring gear portion is received in a ring-like housing that is secured to a handle and that supports or guides the blade for rotation. The blade is driven by a pinion carried by the handle. A flexible cable driven by an external motor, or an air motor incorporated into the handle, drives the pinion.

In some known constructions, e.g., those shown in U.S. Pat. No. 4,198,750 and others, the ring-like housing has an inturned lip that retains a ring-gear portion of the blade and is split to allow expansion for insertion and removal of the blade. Blade replacement requires removal of the blade housing from the handle, spreading of the split housing to release the blade, insertion of a new blade and reattachment of the housing to the handle. The moderate difficulty in doing this discourages blade changing by an operator during use. Other constructions, such as those of a larger type knife shown in No. Re. 25,947, utilized unsplit housing rings, but required an extending arm-like sector portion around one side of the blade and housing, to support a blade-retaining shoe held in place by several securing screws and located by stop screws. The shoe is clamped directly against the blade, squeezing it slightly against the housing to retain it. The operations required for the release and readjustment of the blade-retaining shoe for blade changing discourage blade substitution during a work shift. Also, the arm or sector of the hand piece is of a size and at a location that limits the capability of the knife to an extent unacceptable in smaller trimming knives, in which most portions of the blade and housing, rather than primarily a limited peripheral portion, are used in the cutting operation.

Cutting efficiency depends upon the use of a sharp blade. Yet, because of the difficulty in replacing blades during a work shift, an operator will typically only apply a sharpening steel to the blade while using the knife, in an attempt to maintain sharpness. After a day of use, or sometimes more, the housing or retaining shoe will be removed and the blade sharpened or replaced, typically by shop or maintenance personnel. Unfortunately, steeling of a blade does not maintain or produce an optimum cutting edge and substantially greater efficiency is achieved if a properly sharpened blade is substituted every two to four hours of use.

With known knives and housings, the gear teeth of the blade are exposed to the cut product at the inside blade periphery and tend to engage and carry the cut product in a circular path with the blade. This makes it more difficult to manipulate and control the knife in use and tends to carry meat and fat particles into the interface of the drive pinion and blade.

Split housings cannot be hardened sufficiently to minimize wear while retaining enough spring to allow deformation. Thus, wear from blade pressure and rotation, especially at the peripheral wall of the housing remote from the handle and at the retaining lip underlying the pinion gear, where frictional forces are concentrated because of the manner of use, require frequent housing replacement. When housing lip wear occurs beneath the pinion gear, the resulting additional blade clearance risks loss of driving interengagement between the blade and drive pinion.

An improved construction for a trimming knife that overcomes disadvantages of previous constructions is disclosed in the aforementioned copending application and provides a housing with a recess that permits the blade to be easily changed. However, blade vibration has been experienced at operating speeds that, while usually acceptable, is not desired.

DISCLOSURE OF THE INVENTION

The present invention provides an improved rotary knife having a new and improved blade housing and blade that overcome the above disadvantage and at the same time permit convenient removal and replacement of the blade without removal of the housing, shoe retaining screws, or other parts of the knife from the handle, and without expanding a split housing to remove and replace a blade. Thus, the present knife incorporates the advantages and features of the construction disclosed and claimed in the aforementioned copending application.

More specifically, the knife of the present invention comprises a handle, a ring-like blade housing removably attached to the handle, and a ring blade supported for rotation by the housing. The blade has gear teeth that form a ring gear portion received in the housing and a circular cutting edge that extends from the housing. The blade is driven by a pinion in the handle engaged with the ring gear portion. In use, a portion of the blade and housing is moved through a work body and cut product passes through the central open part of the blade and housing. The particular embodiments disclosed herein are used primarily to trim meat from bone.

The improved knife construction has a housing that receives and guides the blade without restricting insertion and removal of the blade. In the preferred embodiments, this is accomplished with a ring-like housing member that has an arcuate recess or groove open at one axial end of the housing. Inner concentric wall surfaces of the groove that guide the blade are spaced apart at the groove opening a distance greater than internally of the groove to allow free entry of the blade. The two concentric walls provide a very rigid housing construction, inhibiting housing flex during use.

The blade has a ring-gear portion received in the housing groove and a cutting portion extending from the open end of the groove. A circular flange formed by the ring gear portion extends about the periphery of the blade. A blade retainer secured to the handle engages the circular flange to retain the ring-gear portion within the groove. The blade retainer can be loosened relative to the handle and housing for blade removal and tightened to secure a blade, without adjustments, by finger-operable fasteners that remain secured to the handle.

The two inner concentric wall surfaces of the housing embodying the present invention are each of a different shape one from the other, one being cylindrical and the other being frusto-conical in shape. In the event the walls are not fully circular, the surfaces are cylindrically arcuate and frusto-conically arcuate. The inner and outer peripheries of the ring gear portion of the blade are also differently shaped one from the other, one cylindrical and one frusto-conical, to closely mate with the wall surfaces of the recess, but of course with adequate clearance therebetween. It has been found that this construction, i.e., the provision of one peripheral surface of frusto-conical shape of the blade and housing recess, has resulted in reduced vibration of the blade during operation.

In the preferred embodiment of the invention the larger diameter inner concentric wall of the housing is cylindrical and the smaller diameter facing wall is frusto-conical, and the outer periphery of the ring gear portion of the blade is cylindrical while the inner periphery is frusto-conical. This particular arrangement is advantageous from the standpoint of the blade construction. Due to a bevel on the driving pinion gear, the preferred shape of the ring gear portion provides a larger area of mutual contact between the gear teeth of the ring gear and pinion than if the outer periphery of the ring gear were frusto-conical and the inner cylindrical. This larger area of contact results in greater wear life of the gear teeth. The cylindrical outer periphery of the blade ring gear portion is also more readily established to a desired accuracy than a frusto-conical surface. Further, it is thereafter easier to chuck the ring blade on the accurately sized cylindrical outer surface than to grip it by a cylindrical inner surface, with an expanding mandrel, for grinding the frusto-conical surface.

A further feature of the present invention is the provision of a cylindrical inside wall portion on the ring blade between the ring gear portion and an outwardly flared blade portion, the cylindrical inside wall portion being located axially beyond the housing. The smaller diameter wall of the housing is beveled on the outside surface that forms the central opening through which cut product passes, so that it tapers toward the blade at approximately the same angle that the flared blade portion extends; but by virtue of the axial length of the cylindrical inside wall portion of the blade, the substantially parallel beveled surface of the housing and flared surface of the blade are spaced, concentric, frusto-conical surfaces. As a result, cut product moving along the flared blade portion is directed in a path that misses the inside edge of the housing, where the housing would tend to obstruct the product and the product or particles thereof would tend to find their way into the housing recess between the blade and housing wall. This same relationship keeps the housing wall from interfering with a sharpening steel that is held against the inside surface of the flared portion of the blade to sharpen the blade during use.

A still further feature of the invention is a thumb-receiving recess on the handpiece of the knife particularly shaped and located for either right or left hand use to aid the user in manipulating the knife accurately and with less fatigue than with the previous hand piece construction. Because of the presence of fat, blood and juices from the meat product, the handle of a knife becomes slippery during use and it is often difficult to apply the manipulative forces desired to the knife. The present thumb recess properly locates the thumb to facilitate effective application of the forces with a minimum of effort and helps keep the hand from sliding on the handpiece toward the blade.

Embodiments in which the housing portion that forms the concentric walls of the groove completely covers the teeth of the ring gear portion of the blade about both the inside and outside blade surfaces retain the advantages of the housing described in the aforementioned pending application, which include isolation or shielding of the teeth from contact with the work product to reduce the friction between the rotating blade and the work product, rigidity of the housing due to the channel shape, and increased housing life by providing an inner peripheral wall to take part of the frictional wear between the blade and housing that otherwise was entirely borne by the outside wall.

Also, the blade retainer plate, which extends partially around the blade periphery to retain the blade without applying any clamping force can have an edge surface that is in the form of a section of a cylinder to cooperate with a radial flange of the blade or in another embodiment the edge surface can be beveled to cooperate with a frusto-conical blade surface to retain the blade. Due to the bevel, lateral adjustment of the plate compensates for wear and maintains the blade in the desired position.

The blade has an axially short intermediate portion directly adjacent the flange at the base of the gear teeth, with a contour that matches or mates with the edge surface of the blade-retaining plate. The contour of this blade portion accommodates the plate in a close and partially encircling relationship and facilitates plate reversal or adjustment, depending upon whether the contour is cylindrical or tapered.

As suggested by the foregoing, the present invention provides a ring-like housing for a knife for guiding a rotary ring blade used for cutting meat and the like, the housing having two axial ends and an outer periphery, and a circular recess that opens toward one axial end of the housing, spaced inwardly of the outer periphery. The recess has outer and inner spaced concentric circular wall surfaces engageable by the blade and spaced apart farther at said one axial end of the housing than inwardly thereof to allow assembly of the blade with the housing from the said one axial end. One of the said wall surfaces is cylindrical and the other frusto-conical. The present invention also provides a compatible blade and an improved hand piece.

The above and other features and advantages of the invention will be better understood from the detailed description that follows.

BRIEF DESCRIPTION OF THE DRAWINGS

The details of the invention will be described in connection with the accompanying drawings, in which.

BEST MODE FOR CARRYING OUT THE INVENTION

Figure 1:
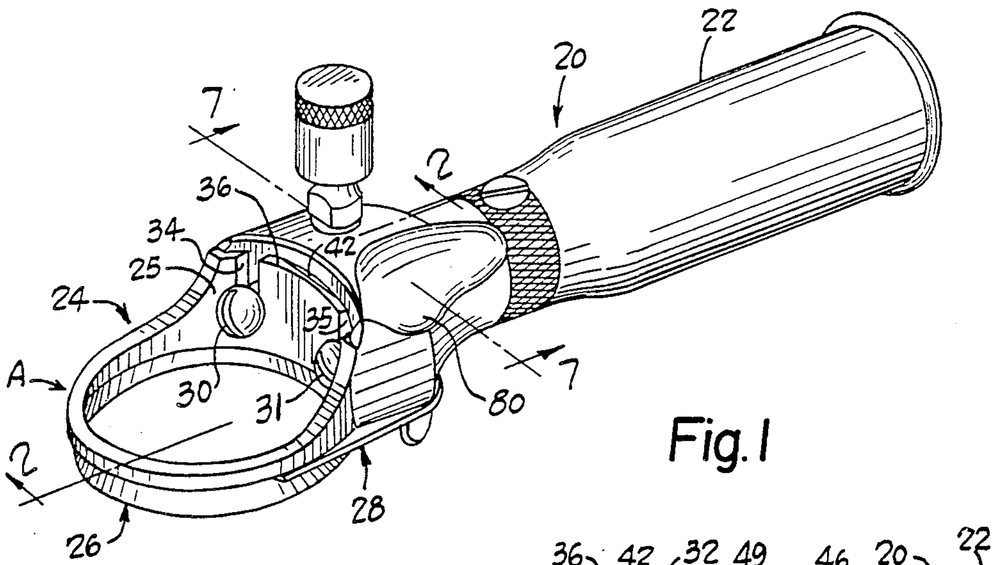
FIG. 1 is a perspective view of a first embodiment of the invention.

A hand knife 20 representing a first embodiment of the invention is shown in FIG. 1 and comprises a handle 22, a ring-like blade housing 24, a continuous ring blade 26 and a blade-retaining plate 28. The blade housing 24, which is removably secured to the handle 22 by screws 30, 31 rotatably guides the blade 26, which is removably held in the housing by the retaining plate 28.

As best shown in FIGS. 1-4, the blade housing 24 is a complete ring with an axially enlarged attachment portion 25 that cooperates with an arcuate front seating surface 32 of the handle 22. Axial slots 34, 35 open through a top edge 36 of the housing portion **24*a* and receive the attachment screws 30, 31. The slots 34, 35, by opening through the top edge 36**, allow removal of the housing by loosening the screws and sliding the housing axially relative to the handle.

A circular groove or recess 38 in the axial end 40 (the lower end in the orientation of FIGS. 1 and 2) of the housing receives the blade 26. Concentric inner wall surfaces **38*a*, 38*b* (FIG. 4) define the cross sectional contour of the recess. One is cylindrical and one frusto-conical in shape. A top wall surface 38*c* spans the distance between the walls 38*a*, 38*b*. In the preferred embodiment shown, the larger diameter wall surface 38*a* surrounds the ring blade and is cylindrical while the smaller diameter wall surface 38*b* is surrounded by the blade and is frusto-conical. It will be appreciated that the concentric walls diverge in a direction from the top wall surface 38*c* toward the recess opening and permit ready entry and removal of the blade, which has a matching contour within the groove. Outer wall surfaces 24*a*, 24*b* of the housing are tapered as shown at 24*c*, 24*d* in FIG. 2 and 4, except that the outer wall is-not tapered where the enlarged portion 25** abuts against the handle. These tapers reduce the obstruction of product by the housing during use.

Figure 2:
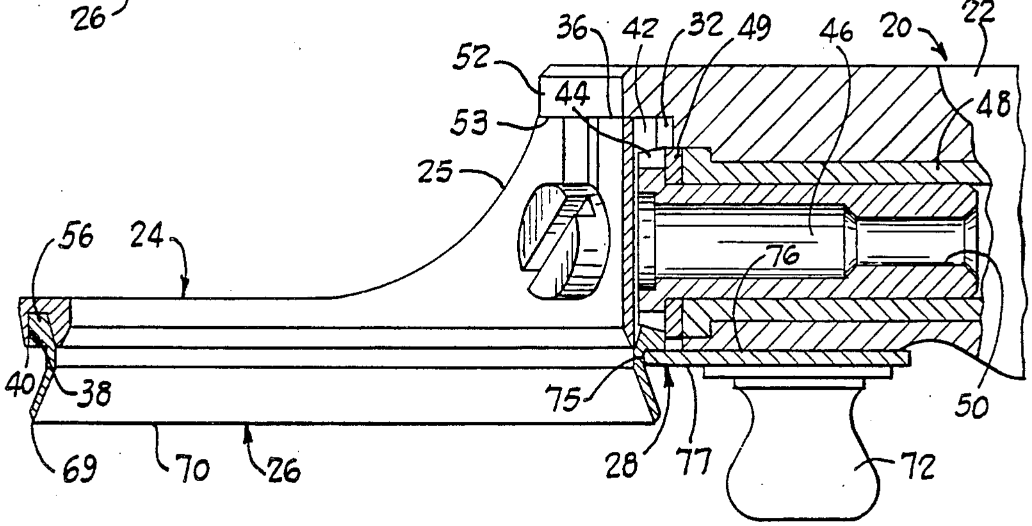
FIG. 2 is a partial longitudinal sectional view taken along the line 2—2 of FIG. 1.
Figure 4:
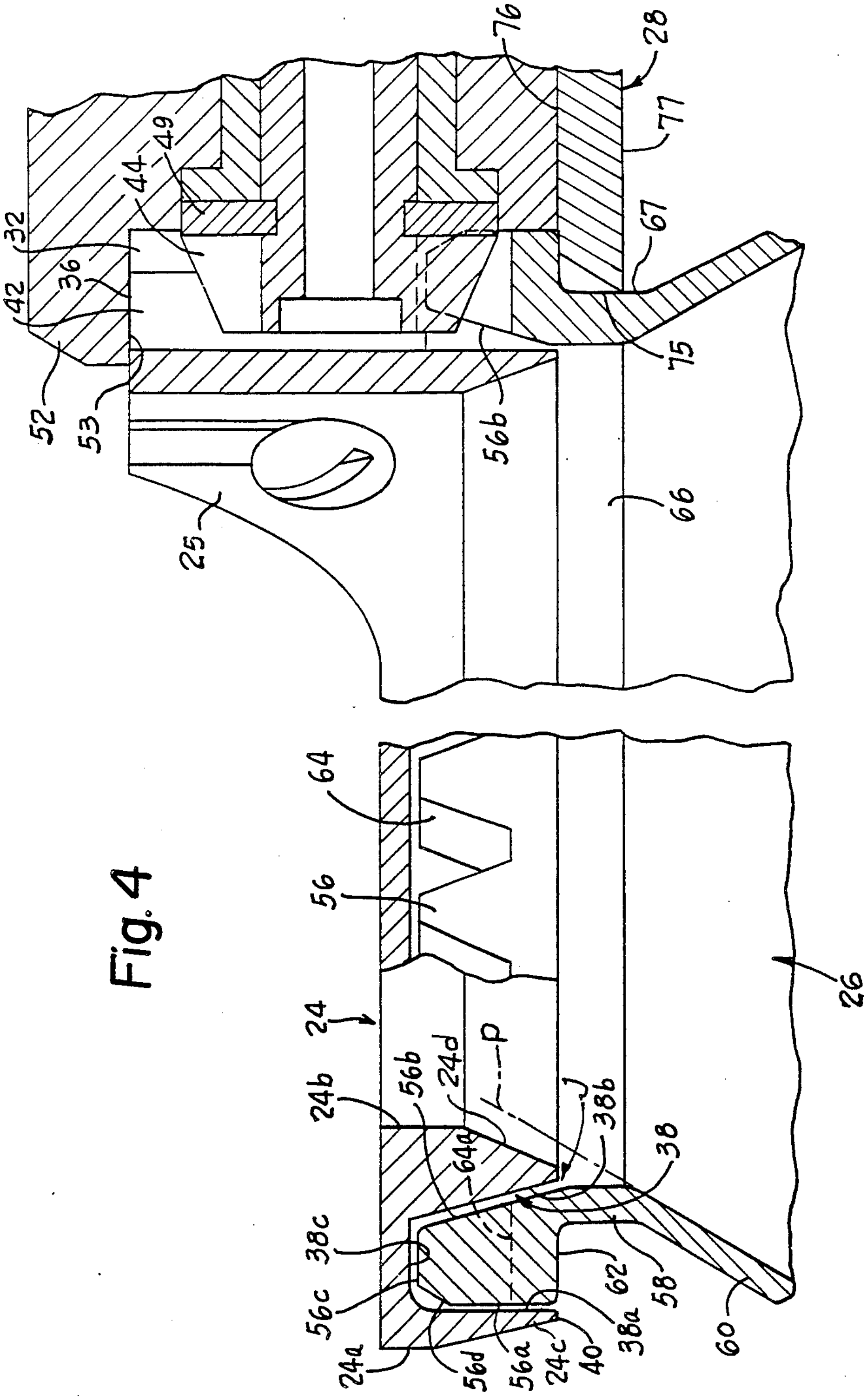
FIG. 4 is a partial enlarged view similar to FIG. 2.

At the axially enlarged portion 25 of the housing, an axial groove 42 is formed in the outside surface that faces the handle. A beveled pinion gear 44 extends from the front handle surface 32 into the groove 42 and enters the circular groove or recess 38 to drive the blade 26 in rotation. As illustrated in FIGS. 1, 2 and 4, the groove 42 opens through the top edge 36 of the housing portion 25 to permit the housing to be moved axially relative to the handle for removal. The pinion gear 44 has a shaft portion 46 that extends into the handle 22 and is supported for rotation in a sleeve bearing 48. A spacer 49 between the end of the sleeve bearing and the gear properly locates the gear for cooperation with the knife blade. The gear 44 in the embodiment shown is rotated by a flexible shaft or cable (not shown) that enters the back of the handle 22 and connects into an aperture 50 in the pinion gear shaft. Rotation of the shaft or cable by an external electric motor drives the pinion, which rotates the blade.

As shown in FIGS. 1, 2 and 4, the handle 22 has a flange or overhang 52 that extends beyond the seating surface 32 for the housing. The top edge 36 of the housing portion 25 abuts a surface 53 of the flange, which locates the housing in a desired axial location relative to the handle.

The blade 26, best shown in FIGS. 2 and 4, has an upper ring gear portion 56, an intermediate cylindrical portion 58 and a lower frusto-conical blade portion 60. An external peripheral radial flange 62 is defined by the ring-gear portion at the juncture with the intermediate cylindrical portiȯn by virtue of a greater radial thickness of the ring-gear portion than the intermediate cylindrical portion. Gear teeth 64 formed in the top surface of the blade extend completely about the blade and mesh with the pinion gear 44. As shown in FIG. 4, the tooth depth of the ring gear portion is less than the depth of the groove or recess 38 from the housing end 40 to the top wall surface **38*c* and the peripheral flange 62 is substantially flush with the lower end surface 40** of the housing.

The outer periphery **56*a* and the inner periphery 56*b* of the ring gear portion of the blade are of different contours, one being cylindrical in shape and the other being frusto-conical, to mate with the contour of the recess 38. In the preferred embodiment shown, the outer periphery 56*a* is cylindrical and the inner periphery 56*b* is frusto-conical, with the ring gear portion then being narrower at a top surface 56*c* than at the roots 64*a* of the gear teeth or at the flange 62. The juncture between the cylindrical surface 56*a* and the top surface 56*c* is formed by a chamfered or-beveled surface 56*d***.

Figure 5:
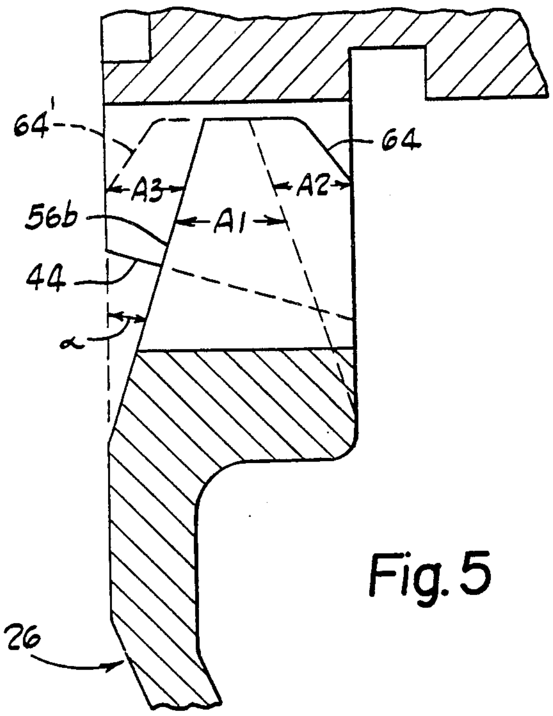
FIG. 5 is a partial enlarged sectional view showing a detail of FIG. 4.

In the preferred embodiment, the taper of the frusto-conical surface **56*b* is at an angle $\alpha$ of approximately 15° with the central axis of the surface, as indicated in FIG. 5. The angle of the housing wall surface 38*b* is the same (i.e., 15°) with the central axis and the cylindrical wall 38*a***.

While the provision of one periphery of the ring gear portion and one wall of the housing recess frusto-conical has been found to reduce vibration of the blade during rotation, the selection of the inner periphery **56*b* as being the frusto-conical shape is based on obtaining increased wear life and also to facilitate accurate machining through external chucking of the blade on an initially established cylindrical surface 56*a*, which can be readily obtained with desired accuracy. Increased wear life results from maximizing the area of contact between the pinion gear teeth and the ring gear teeth. The area of contact obtained in the preferred embodiment is shown in solid line in FIG. 5 while the area obtained if the outside periphery is frusto-conical and the inside cylindrical is shown in phantom at 64'**. The contact area marked Al is common to both embodiments. The contact area A2 obtained with the preferred embodiment is greater than the area A3 obtained with the alternative.

The intermediate portion 58 of the blade 26 has an inside surface 66 and an outside surface 67, both of which are cylindrical. The outside cylindrical surface 67 has an axial length equal to or just slightly greater than the thickness of the blade retaining plate 28. The blade portion 60 is substantially longer axially than the intermediate cylindrical portion and is flared outward in the blade shown, a shape that is suitable for deboning meat. The blade is ground along a surface 69 to produce a cutting edge 70.

Because the inside surface 66 extends from the recess 38 a significant distance, as shown in FIG. 4, and the fact that the angle at which the blade portion 60 extends is substantially the same as the angle of the tapered surface 24*d* of the housing, results in establishing a path, indicated by the imaginary line P in FIG. 4, for cut portions of work product, such as meat or the like, that avoids impingement of the product at the juncture J between the blade and housing as the cut portion passes through the central opening of the blade and housing. This minimizes any tendency of cut particles to interfere with blade rotation. It also allows an operator to place a sharpening steel along the inside surface of the flared portion of the blade to sharpen the blade edge, without any interference between the housing edge and the sharpening steel.

The manner in which the blade 26 is retained in the housing 24 is shown in FIGS. 1–4. As illustrated, the height and width or thickness of the gear portion 56 in the groove or cavity 38 establishes a clearance at the top and side walls of the groove when the peripheral flange 62 is flush with the end surface 40 of the housing 24. The retainer plate 28 is secured to the handle 22 in a relationship that opposes the blade flange 62 and is located flush with the axial end of the housing to prevent the blade flange from moving out of the housing, but without applying damping pressure to the blade that would urge it against the housing. Also little or no lateral pressure is applied between the retaining plate and the intermediate cylindrical portion 58 of the blade. As a result of this construction, the blade is freely rotatable between the housing and retaining plate.

Figure 3:
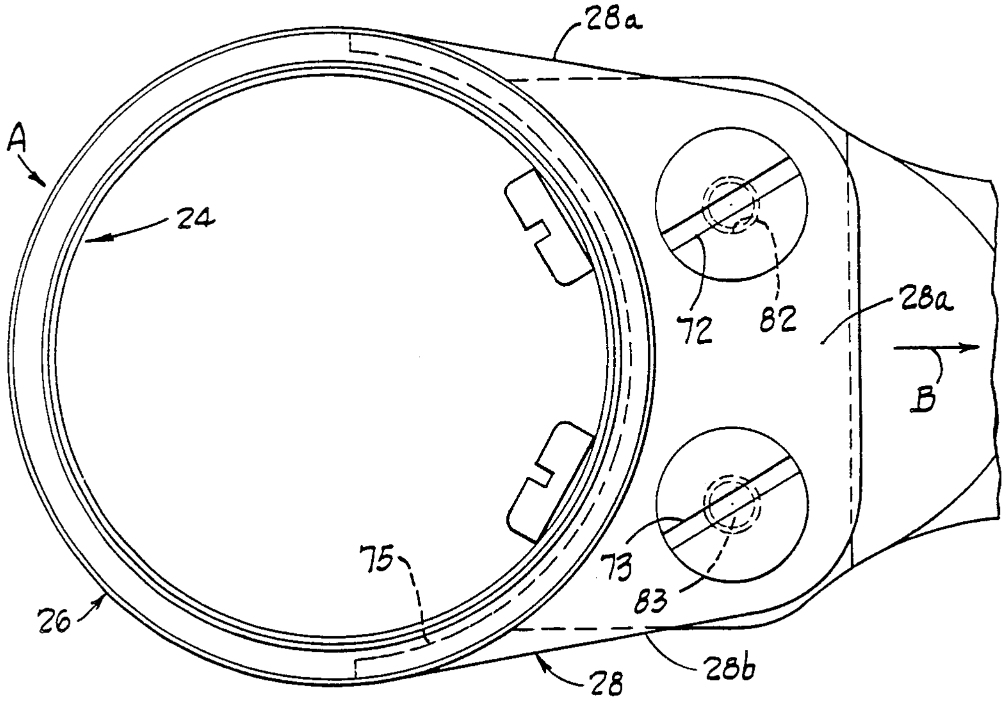
FIG. 3 is a partial bottom plan view of the embodiment of FIG. 1.

As best shown in FIG. 3, the blade retaining plate 28 is generally yoke shaped, having a base portion 28*a* for securing the plate to the handle with finger screws 72, 73, and having extending finger portions 28*b*, 28*c* on each side of the housing, projecting forwardly of the handle. The plate 28 has a concave arcuate (substantially semi-circular) contour 75 facing the blade along the two finger portions and across the base portion. The surface of the arcuate portion has straight line elements perpendicular to opposite top and bottom faces 76, 77 of the plate; i.e., the thickness surface of the arcuate contour 75 is a segment of a cylinder that mates or matches with the outside surface 67 of the intermediate portion of the blade. The blade retaining plate closely surrounds the blade to oppose a portion of the peripheral radial flange 62 and also opposes the end surface 40 of the housing. The finger portions 28*b*, 28*c* are narrow and extend only slightly beyond the outside wall periphery 80 of the housing, to avoid interference with knife manipulation during use.

The base portion 28*a* of the retaining plate has two holes 82, 83 to receive the screws 72, 73. The screws each have a neck portion that is smaller than the respective hole 82 or 83 and of an axial length greater than the thickness of the plate 28. Thus, when each screw is loosened a few turns, to place the neck portion within the respective holes 82, 83, the plate 28 can readily tilt relative to the handle, spacing the finger portions 28*b*, 28*c* away from the lower axial end 40 of the housing far enough to allow the blade 26 to drop out of the recess 38.

Because the shape of the plate 28 in the thickness dimension along the arcuate contour 75 is cylindrical, the plate can be reversed (i.e., the surface 77 can be placed against the handle and housing instead of the surface 76) after surface wear occurs on the plate from blade rotation.

Figure 7:
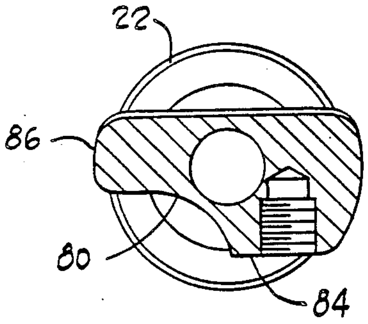
FIG. 7 is a transverse sectional view taken along the line 7—7 of FIG. 6.
Figure 6:
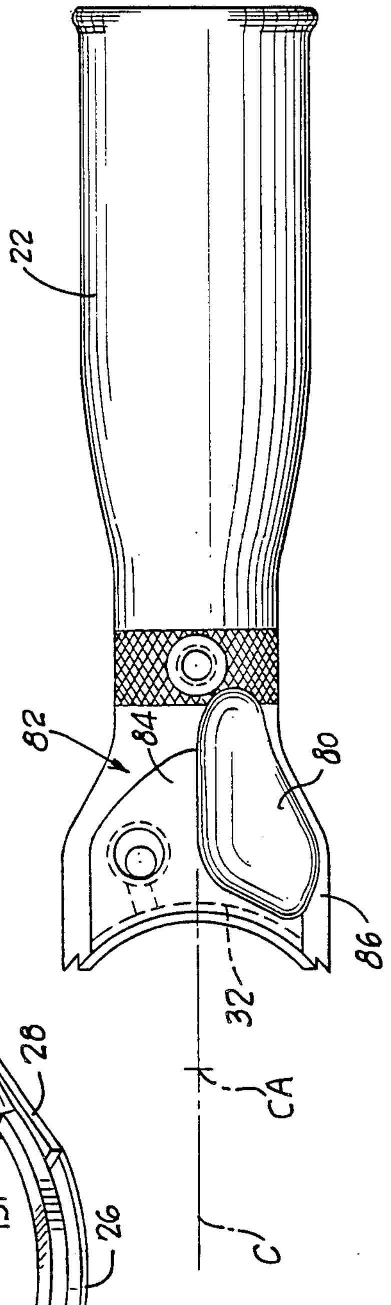
FIG. 6 is top plan view of the handpiece of FIG. 1.

The handpiece 20 of the present invention has an improved contour, specifically a thumb-receiving depression 80 best shown in FIGS. 1, 6 and 7. Because an operator must move the knife deftly in a variety of directions in use and the environment tends to make the handle slippery and difficult to hold, a recess or depression 80 elongated in the direction the handle extends has been located in an end portion 82 adjacent the housing and laterally to one side of a longitudinal centerplane C of the handpiece, which plane includes the common central axis CA of the blade and housing. The depression is in a surface 84 that faces away from the cutting edge of the blade, toward the operator, and the depression also opens through a lateral surface 86, so it opens in directions axially and laterally of the housing. When an operator grips the handle 22 in the palm of the hand, the recess or depression is located to receive the operators thumb. The handpiece shown is constructed to be gripped by the right hand, but the construction can be reversed to locate the depression on the opposite side of the axis CA for use with the left hand. Because the depression does not open forwardly of the handle, it provides an effective aid to preventing the operator's hand from slipping toward the blade as well as giving the operator's thumb a surface to effectively act against. Because the operator's thumb is located at a lower level than otherwise by virtue of the depression, palm contact of the gripping hand with the handle is greater. This relieves muscle stress and reduces repetitive trauma disorders associated with the arm, wrist, and hand of those who work with such equipment.

In use, much of the cutting performed with the knife is with that half of the blade that is remote from the handle, to which the arrow A points in FIG. 1. The cutting action in which the blade is moved into the product is often accompanied by a pulling movement of the knife in the direction indicated in FIG. 3 by the arrow B. With prior known housings having an underlying lip beneath the peripheral flange of the blade and lacking an inner wall surface 38*b*, wear was concentrated on the housing at the wall portion 38*a* farthest from the handle, i.e., in the region of arrow A, and at the lip underlying the blade flange beneath the pinion 44. These locations of wear were occasioned by the pressing and pulling action on the blade, forcing it against the surrounding housing wall and causing the blade to tilt, which pressed the peripheral flange downward in the area beneath the pinion. Lip wear in the area beneath the pinion would allow the blade to drop sufficiently that interengagement between the pinion and blade gear teeth would be lost. With the present arrangement, movement of the blade against the outer wall 38*c* in the area A by a pulling action of the knife in the direction indicated by the arrow B results in contact of the inside periphery of the knife blade with the inner wall 38*b* in the area of the housing adjacent the handle. As a result, portions of both the inside wall 38*b* and the outside wall 38*c*, which face the handle, will absorb wear, substantially doubling the life of the housing. Wear beneath the pinion 44 is taken by the plate 28 rather than a housing lip. Typically the plate 28 can be plated with or made of a harder, more abrasive-resistant material than the housing because it does not require substantial machining. In addition, the plate can be reversed to absorb twice the wear that a single surface could otherwise tolerate.

Figure 8:
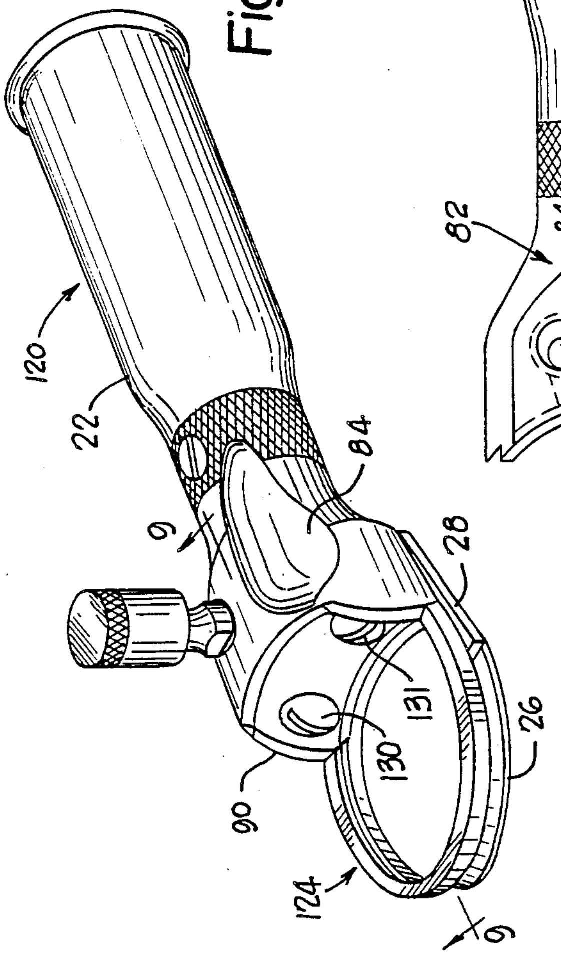
FIG. 8 is a perspective view of a second embodiment of the invention.
Figure 9:
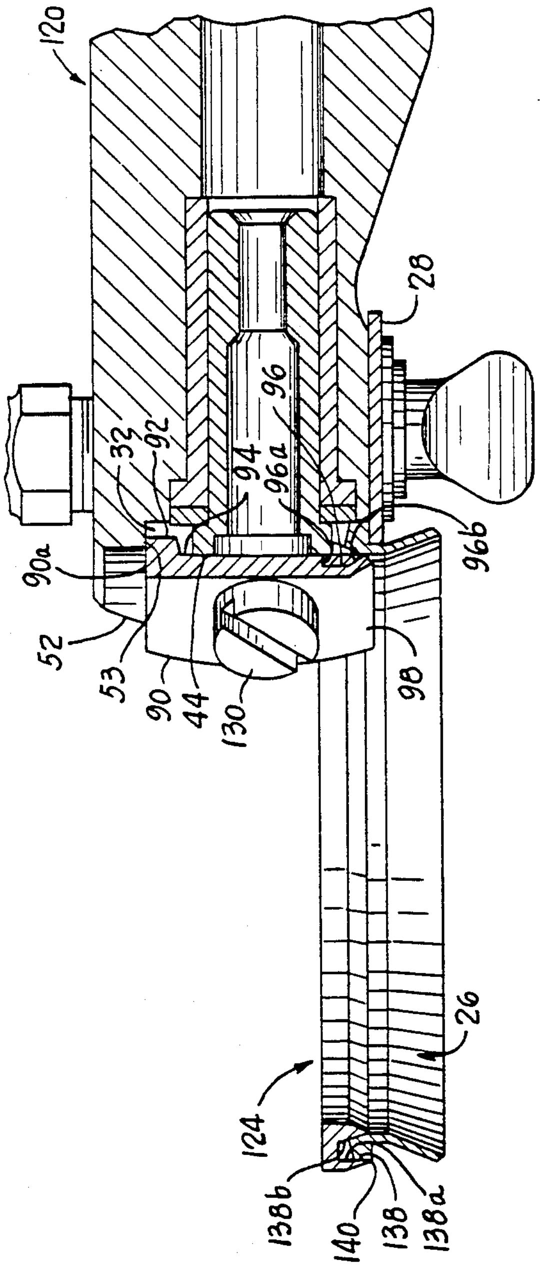
FIG. 9 is a longitudinal sectional view taken along the line 9—9 of FIG. 8.
Figure 10:
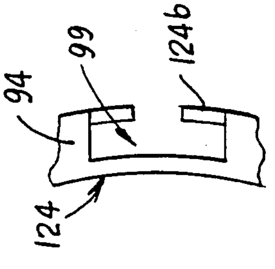
FIG. 10 is a partial top plan view of the blade housing of the embodiment of FIG. 8.

A second embodiment of the invention is shown in FIGS. 8–10, in which like reference numbers identify identical parts to those of the previous embodiment and similar but different parts are indicated by the same reference numeral but in a 100 series, and in a third embodiment, in a 200 series.

A hand knife 120 is shown in FIG. 8 having a handle 22, a ring-like blade housing 124, a continuous ring blade 26 and a blade-retaining plate 28.

The blade housing 124 is a metal ring of uniform axial height (i.e., without the enlarged portion 25 of the previous embodiment) with a groove or recess 138 opening through an axial end 140. The recess 138 is of a shape identical to that of the recess 38; i.e., a wall surface **138*a* that surrounds the ring-gear portion of the blade is cylindrical and a concentric wall surface 138*b*** that is surrounded by the ring-gear portion of the blade is frusto-conical.

A portion of the outer periphery of the blade housing abuts against the arcuate front seating surface 32 of the handle and the housing is secured in place by a housing retaining plate 90 fastened to the handle by screws 130, 131. The plate 90 is arcuate and a major portion of a rear surface 92 conforms to the front seating surface 32. A recess 94 is formed in the rear surface of the plate to receive the pinion gear 44. Also, an arcuate recess 96 is formed in the rear surface 92, just above a lower edge 98 of the plate 90, for receiving the blade housing 124. When the plate 90 is secured to the handle, it rigidly holds the housing 124 in place against axial and transverse movement relative to the handle.

As shown in FIG. 9, the surface 53 of the flange or overhang 52 of the handle 22 opposes an edge surface **90*a* of the plate 90 to locate the plate in a desired axial location relative to the handle. In addition, the blade-retaining plate 28 serves to also hold the housing and the plate 90 in proper position with the plate against the overhang 52. Thus, the locations of the housing and housing retaining plate are not dependent upon the screws 130, 131, but rather upon the surface 53**.

As shown in FIG. 9, an upper surface **96*a* of the recess 96 extends the full width of the housing ring, except where the pinion is received, and a lower surface 96*b*; underlies the bottom end surface 140 of the housing that is located radially within the ring blade 26** and serves as a retaining lip for the housing.

The housing 124 has an opening 99 (FIG. 10) through a top surface 94 and through the outside wall periphery **124*b* of the housing 124 in the pinion area, for entry of the pinion into the housing to cooperate with the ring gear portion 56 of the blade 26**.

The housing 124 of this embodiment is less expensive than the housing 24 and thus attachment using the reusable housing retaining plate 90 results in cost savings when housings are replaced.

As will be apparent from the drawings, the other structures of the embodiment of FIGS. 8–10 are identical to those already described in the embodiment of FIGS. 1–7.

Figure 11:
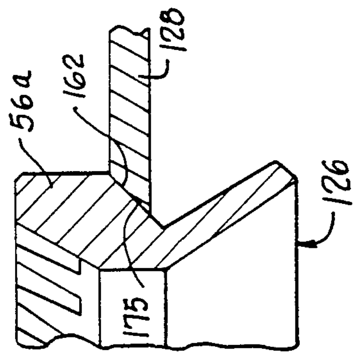
FIG. 11 is a partial sectional view of a modified blade construction embodying the present invention.

A modified blade 126 is shown in FIG. 11 identical to the blade 26 except that instead of the radial flange 62 an inclined or frusto-conical flange 162 is provided that tapers inwardly from the outer periphery **56*a* of the ring gear portion to the thinner blade portion. The flange 162 cooperates with a beveled arcuate surface 175 of the retaining plate 128** so that adjustment of the plate toward or away from the blade in the plane of the plate will change the axial position of the blade in the housing and such adjustment can be used to assure proper engagement between the drive pinion and blade, notwithstanding wear of the blade, housing or plate.

Figure 12:
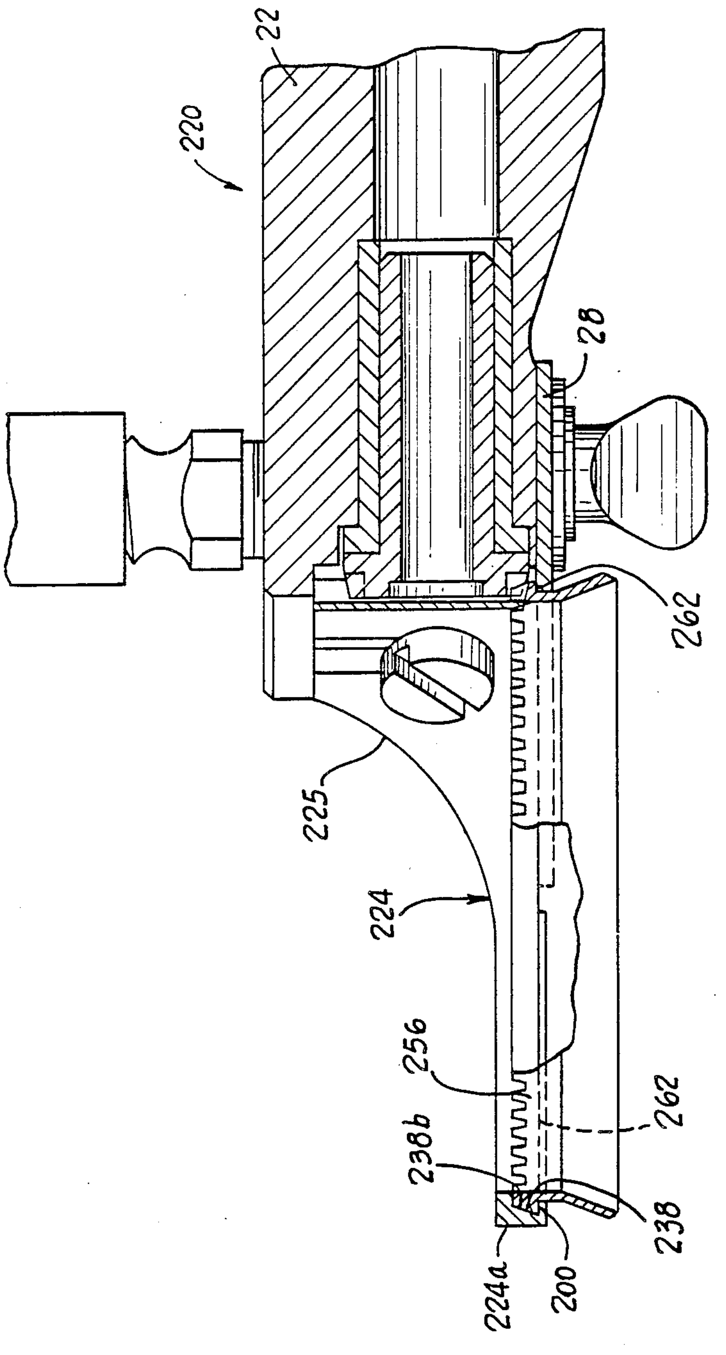
FIG. 12 is a partial sectional view of a third embodiment of the invention.

A third embodiment of a housing is shown in FIG. 12, in which like numbers identify parts identical to those of the previous embodiments. A hand knife 220 is shown having a handle 22, a ring like blade housing 224, a continuous ring blade 26, and a blade retaining plate 28.

The blade housing 224 is generally similar to the housing 24 in the manner of mounting to the handle with an axially elongated portion 225; but the blade-receiving recess 238 is of different construction, providing a circumferential axial wall **224*a* with an internal wall surface 238*b* facing a surrounded ring gear portion 256 and an inturned lip 200 extending peripherally approximately, but no more than, 180° and located diametrically opposite from the axially elongated portion 225. An inside wall surface 238*b* is frusto-conical in shape with the largest diameter portion adjacent the lip 200. A radial flange 262 of the blade is supported by the lip 200 at the part of the housing remote from the handle and by the plate 28 at the part near the handle. This arrangement allows insertion and removal of the blade by allowing the portion near the handle to drop down when the plate is loosened and allow the ring gear portion to slide out from within the recess 238**. This construction provides a thin profile for those portions of the housing and blade that pass through the product, but has the disadvantage of exposing the ring gear teeth to the product.

While preferred embodiments of the invention have been described with particularity, it will be understood that modifications can be made therein without departing from the spirit and scope of the invention set forth in the appended claims.

I claim:

1. For use in a hand knife of the type having a rotary ring blade for cutting meat and other suitable products, a ring blade housing having an axially elongated peripherally continuous portion adapted to be secured to a handle, to cover a blade-driving pinion in the handle, and to guide a continuous ring blade rotatable in the housing, said housing having two axial ends and an outer periphery, a circular recess that opens toward one axial end of the housing, spaced inwardly of the outer periphery, said recess having two radially spaced concentric side wall surfaces one of which is a surface of revolution that forms the recess wider at the opening than interiorly thereof, and said housing having two peripherally spaced axially extending slots in the elongated portion opening through the other axial end.

2. For use in a hand knife of the type having a rotary ring blade for cutting meat and other suitable products, a ring blade housing having an axially elongated peripherally continuous portion adapted to be secured to a handle, to cover a blade-driving pinion in the handle, and to guide a continuous ring blade rotatable in the housing, said housing having two axial ends and an outer periphery, a circular recess that opens toward one axial end of the housing, spaced inwardly of the outer periphery, said recess having two radially spaced concentric side wall surfaces one of which is cylindrical and the other of which is frusto-conical, said recess being widest at the recess opening, and said housing having two peripherally spaced axially extending slots in the elongated portion opening through the other axial end.

3. For use in a hand knife of the type having a rotary ring blade for cutting meat and other suitable products, a ring blade housing having an axially elongated peripherally continuous portion adapted to be secured to a handle, to cover a blade-driving pinion in the handle, and to guide a continuous ring blade rotatable in the housing, said housing having two axial ends and an outer periphery, a circular recess that opens toward one axial end of the housing, spaced inwardly of the outer periphery, said recess having two radially spaced concentric side wall surfaces, an inner one of which is a surface of revolution that forms the recess wider at the opening than interiorly thereof, and said housing having two peripherally spaced axially extending slots in the elongated portion opening through the other axial end.

4. For use in a hand knife of the type having a rotary ring blade for cutting meat and other suitable products, a ring blade housing having an axially elongated peripherally continuous portion adapted to be secured to a handle, to cover a blade-driving pinion in the handle, and to guide a continuous ring blade rotatable in the housing, said housing having two axial ends and an outer periphery, a circular recess that opens toward one axial end of the housing, spaced inwardly of the outer periphery, said recess having two radially spaced concentric side wall surfaces, an outer one of which is cylindrical and an inner one of which is frusto-conical, said recess being widest at the recess opening, and said housing having two peripherally spaced axially extending slots in the elongated portion opening through the other axial end.

5. A ring-like housing for guiding a rotary ring blade used for cutting meat and other suitable products, said housing having two axial ends and an outer periphery, a circular recess that opens toward one axial end of the housing, spaced inwardly of the outer periphery, and having outer and inner spaced concentric circular wall surfaces engageable by the blade and spaced apart farther at said one axial end of the housing than inwardly thereof to allow assembly of the blade with the housing from the said one axial end, one of the said wall surfaces being a surface of revolution that forms the recess wider at the opening than interiorly thereof.

6. A ring-like housing for guiding a rotary ring blade used for cutting meat and other suitable products, said housing having two axial ends and an outer periphery, a circular recess that opens toward one axial end of the housing, spaced inwardly of the outer periphery, and having outer and inner spaced concentric circular wall surfaces engageable by the blade and spaced apart farther at said one axial end of the housing than inwardly thereof to allow assembly of the blade with the housing from the said one axial end, one of the said wall surfaces being cylindrical and the other being a surface of revolution that forms the recess wider at the opening than interiorly thereof.

7. A ring-like housing as set forth in claim 6 wherein said outer wall surface is cylindrical and said inner wall surface is frusto-conical.

8. For use in a hand knife of the type having a rotary ring blade for cutting meat and other suitable products, a ring-like blade housing adapted to be secured to a handle and to guide a continuous ring blade rotatable in the housing, said housing having two axial ends and an outer periphery, an arcuate recess that opens toward one axial end of the housing, spaced inwardly of the outer periphery, and having two spaced concentric arcuate wall surfaces engageable by the blade, one of said surfaces being a surface of revolution that forms the recess wider at the opening than interiorly thereof.

9. For use in a hand knife of the type having a rotary ring blade for cutting meat and other suitable products, a ring-like blade housing adapted to be secured to a handle and to guide a continuous ring blade rotatable in the housing, said housing having two axial ends and an outer periphery, an arcuate recess that opens toward one axial end of the housing, spaced inwardly of the outer periphery, and having two spaced concentric arcuate wall surfaces engageable by the blade, one of said surfaces being cylindrical and the other being a surface of revolution that forms the recess wider at the opening than interiorly thereof.

10. For use in a hand knife of the type having a rotary ring blade for cutting meat and other suitable products, a ring-like blade housing adapted to be secured to a handle and to guide a continuous ring blade rotatable in the housing, said housing having an arcuate recess for receiving a toothed portion of the ring blade and from which a cutting portion of the blade extends, and having a peripheral wall that is frusto-conically arcuate with a minor radius at an axial end of the wall that is adjacent the toothed portion of the blade and a major radius adjacent the opposite axial end from which the cutting portion extends.

11. A gear-driven ring blade for a hand knife of the type used for cutting meat and other suitable products, said blade comprising: a ring gear portion at one axial end of the blade and an outwardly flared thinner portion extending therefrom to the other axial end and terminating at the other axial end in a cutting edge, and an exterior peripheral flange at the juncture between the thicker and thinner portions, the ring gear portion having an inner and an outer peripheral surface and the flared thinner portion having an inner peripheral surface, all of said surfaces being different surfaces of revolution, said ring gear portion increasing in thickness axially and being thickest at said flange.

12. A gear-driven ring blade for a hand knife of the type used for cutting meat and other suitable products, said blade comprising: a ring gear portion at one axial end of the blade and an outwardly flared thinner portion extending therefrom to the other axial end and terminating at the other axial end in a cutting edge, and an exterior peripheral flange at the juncture between the thicker and thinner portions, said flange being frusto-conical in shape, and the ring gear portion having an inner and an outer peripheral surface, one of which is cylindrical and the other of which is tapered.

13. A gear-driven ring blade for a hand knife of the type used for cutting meat and other suitable products, said blade comprising: a ring gear portion at one axial end of the blade and an outwardly flared thinner portion extending therefrom to the other axial end and terminating at the other axial end in a cutting edge, and an exterior peripheral flange at the juncture between the thicker and thinner portions, the ring gear portion having a cylindrical outer peripheral surface and a frusto-conical inner peripheral surface angled in an opposite direction from that of said flared thinner portion, said ring gear portion being thinnest at the said one axial end.

14. A gear-driven ring blade as set forth in claim 13 wherein said exterior peripheral flange is radial.

15. A hand knife for cutting meat and other suitable products, comprising a handle; a ring-like blade housing at one end of the handle and having a central axis; a continuous ring blade rotatable in the housing about said axis; and means to retain the blade in the housing; said housing having two axial ends and an outer periphery, an arcuate recess for the blade opening toward one axial end of the housing, spaced inwardly of the outer periphery, and having two spaced concentric arcuate wall surfaces engageable by the blade, one of said surfaces being cylindrically arcuate in shape and the other being a surface of revolution that forms the recess wider at the opening than interiorly thereof; said handle having an arcuate face and a face transverse thereto for locating said housing relative to the handle; and said blade having gear teeth received in said recess and a cutting portion extending from thè housing, the gear teeth having inner and outer peripheral surfaces that match in contour the facing wall surfaces of the housing that forms the recess.

16. A hand knife as set forth in claim 15 wherein said handle has an elongated grip portion and an end portion to which the housing is attached, said end portion including an elongated depression extending in the longitudinal direction of the grip portion and on one side only of an imaginary plane along the longitudinal centerline of the grip portion and containing said axis, said depression opening in directions axially and laterally of said housing and being of a size and shape to accommodate and locate a user's thumb when the grip portion is held in the user's hand.

17. A hand knife as set forth in claim 15 wherein the outer concentric arcuate wall surface is cylindrical and the inner is frusto-conical.

18. A hand knife for cutting meat and other suitable products, comprising a handle; a ring-like blade housing secured at one end of the handle; a continuous ring blade rotatable in the housing; and means to retain the blade in the housing; said housing having two axial ends and an outer periphery, an arcuate recess for the blade opening toward one axial end of the housing, spaced inwardly of the outer periphery, and having two spaced concentric arcuate wall surfaces engageable by the blade, one of said surfaces being cylindrically arcuate in shape and the other being a surface of revolution that forms the recess wider at the opening than interiorly thereof; and said blade having gear teeth received in said recess and a cutting portion extending from the housing, the gear teeth having inner and outer peripheral surfaces that match in contour the facing wall surfaces of the housing that form the recess.

19. A hand knife for cutting meat and other suitable products, comprising a handle; a ring-like blade housing secured at one end of the handle; a continuous ring blade rotatable in the housing; and means to retain the blade in the housing; said housing having two axial ends and an outer periphery, an arcuate recess for the blade opening toward one axial end of the housing, spaced inwardly of the outer periphery, and having two spaced concentric arcuate wall surfaces engageable by the blade, an outer one of said surfaces being cylindrically arcuate in shape and an inner one being frusto-conically arcuate in shape, the space between the walls being greatest at said one axial end of the housing; and said blade having gear teeth received in said recess and a cutting portion extending from the housing, the gear teeth having inner and outer peripheral surfaces, the said outer peripheral surface being cylindrical and facing the said cylindrically arcuate wall surface and the inner peripheral surface being frusto-conical and facing the said frusto-conically arcuate wall surface.

20. A hand piece for a knife for cutting meat and other suitable products, the hand piece being adapted to support a ring-like housing for a rotary ring blade, said hand piece having an elongated grip portion and an end portion adapted to support and locate said housing, said end portion including an arcuate face and an elongated depression extending in the longitudinal direction of the grip portion and laterally offset from an imaginary plane along the longitudinal centerline of the grip portion and containing the axis of curvature of said face, said depression opening in directions parallel to and transversely of said axis and being of a size and shape to accommodate and locate a user's thumb when the grip portion is held in the user's hand.

21. A ring-like blade housing and a continuous ring blade rotatable in the housing, for a hand knife used for cutting meat and other suitable products, said housing having two axial ends and an outer periphery, a circular recess that opens toward one axial end of the housing, spaced inwardly of the outer periphery, and having outer and inner spaced concentric circular wall surfaces engageable by the blade and spaced apart farther at said one axial end of the housing than inwardly thereof to allow assembly of the blade with the housing from the said one axial end, one of the said wall surfaces being cylindrical and the other being a surface of revolution that forms the recess wider at the opening than interiorly thereof and said blade having a ring gear portion at one axial end of the blade and a thinner portion extending therefrom to the other axial end and terminating at the other axial end in a cutting edge, and an exterior peripheral flange at the juncture between the thicker and thinner portions, the thinner portion including a cylindrical inwardly facing intermediate surface portion adjacent the flange and an outwardly flared blade portion extending from the intermediate surface portion toward the cutting edge, the ring gear portion having inner and outer peripheral surfaces that match in contour the facing wall surfaces of the housing that form the recess, and wherein said housing has a beveled surface on its inside diameter adjacent the recess opening and the flared thinner portion of the blade is spaced axially from the beveled surface of the housing by the said cylindrical intermediate surface portion.

22. For use in a hand knife of the type having a rotary ring blade with gear teeth at one axial end and a cutting edge at the opposite axial end for cutting meat and other suitable products, a ring blade housing to guide the blade having an axially elongated peripherally continuous portion adapted to be secured to a handle and a circumferential outer wall for at least partially encircling a gear tooth portion at one axial end of the balde, said outer wall having a surface facing inwardly to guide the blade about said gear tooth portion, said surface being a surface of revolution that has a large diameter at one axial end than at the other.

23. A ring blade housing as set forth in claim 22 including an inturned blade-retaining flange at each axial end of said surface.

24. For use in a hand knife of the type having a rotary ring blade for cutting meat and other suitable products, a ring blade housing to guide the blade having an axially elongated peripherally continuous portion extending in one axial direction adapted to be secured to a handle and a circumferential outer wall for at least partially encircling the blade, said outer wall having a surface facing inwardly to guide the blade, said surface being a surface of revolution that tapers radially outward in the opposite axial direction from said one direction.

25. A ring-like blade housing adapted to be secured to a handle of a hand knife of the type having a rotary power-driven continuous ring blade for cutting meat and other suitable products, said housing having a recess wholly or partially circular for receiving and guiding a toothed axial end portion of the ring blade and from which a cutting portion of the blade extends, said recess formed at least in part by a circumferential wall that at least partially encircles the blade and has a continuous contour of gradually increasing diameter, beginning at an inner axial end of the recess.

26. A housing as set forth in claim 25 wherein the wall terminates at an inturned flange where its diameter is largest.

27. A ring-like blade housing adapted to be secured to a handle of a hand knife of the type having a rotary power-driven continuous ring blade for cutting meat and other suitable products, said housing having a recess wholly or partially circular for receiving and guiding a toothed axial end portion of the ring blade and from which a cutting portion of the blade extends, said recess formed at least in part by a circumferential wall that is encircled by the blade and has a continuous contour of gradually decreasing diameter, beginning at an inner axial end of the recess.

* * * * *

UNITED STATES PATENT AND TRADEMARK OFFICE
CERTIFICATE OF CORRECTION

PATENT NO. : 4,637,140
DATED : January 20, 1987
INVENTOR(S) : Louis A. Bettcher

It is certified that error appears in the above—identified patent and that said Letters Patent is hereby corrected as shown below:

Column 6, line 37, "or-beveled" should be -- or beveled --.
Column 9, line 48, after "96b" delete the semi-colon (;).
Column 12, line 34 (claim 11), after "end" insert
-- , having an increasing diameter, --.
Column 14, line 55 (claim 22), "balde" should be -- blade --;
line 58 (claim 22), "large" should be -- larger --.

Signed and Sealed this

Third Day of November, 1987

*Attest:*

DONALD J. QUIGG

*Attesting Officer*

*Commissioner of Patents and Trademarks*